Feb. 8, 1955  G. M. MEISEL ET AL  2,701,742
BEARING ASSEMBLY FOR ROTARY MACHINE ELEMENTS
Filed June 30, 1950  2 Sheets-Sheet 2
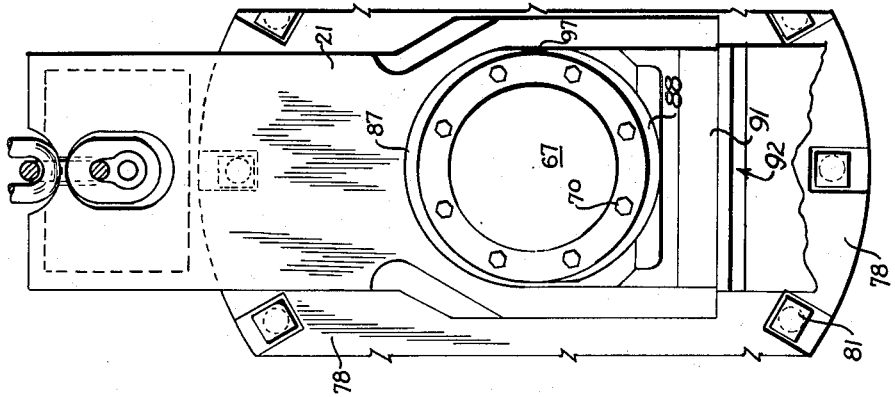
FIG.—3
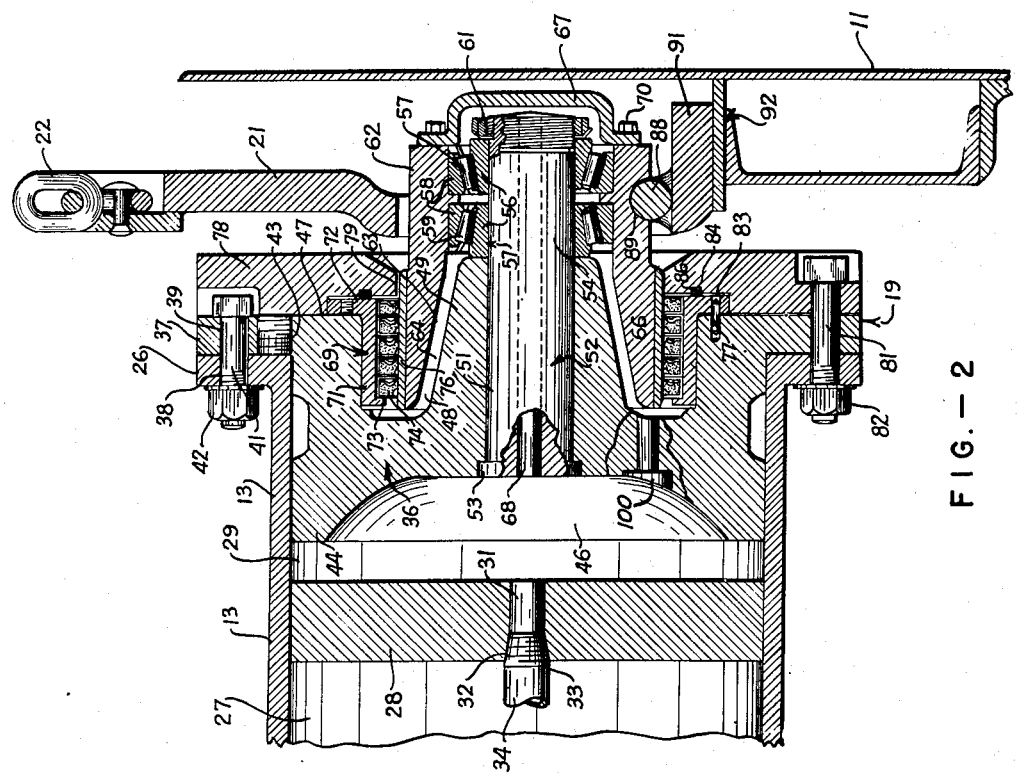
FIG.—2
INVENTORS
George M. Meisel,
Harry P. Kautz and
John C. Hupp
BY
*ATTORNEY*

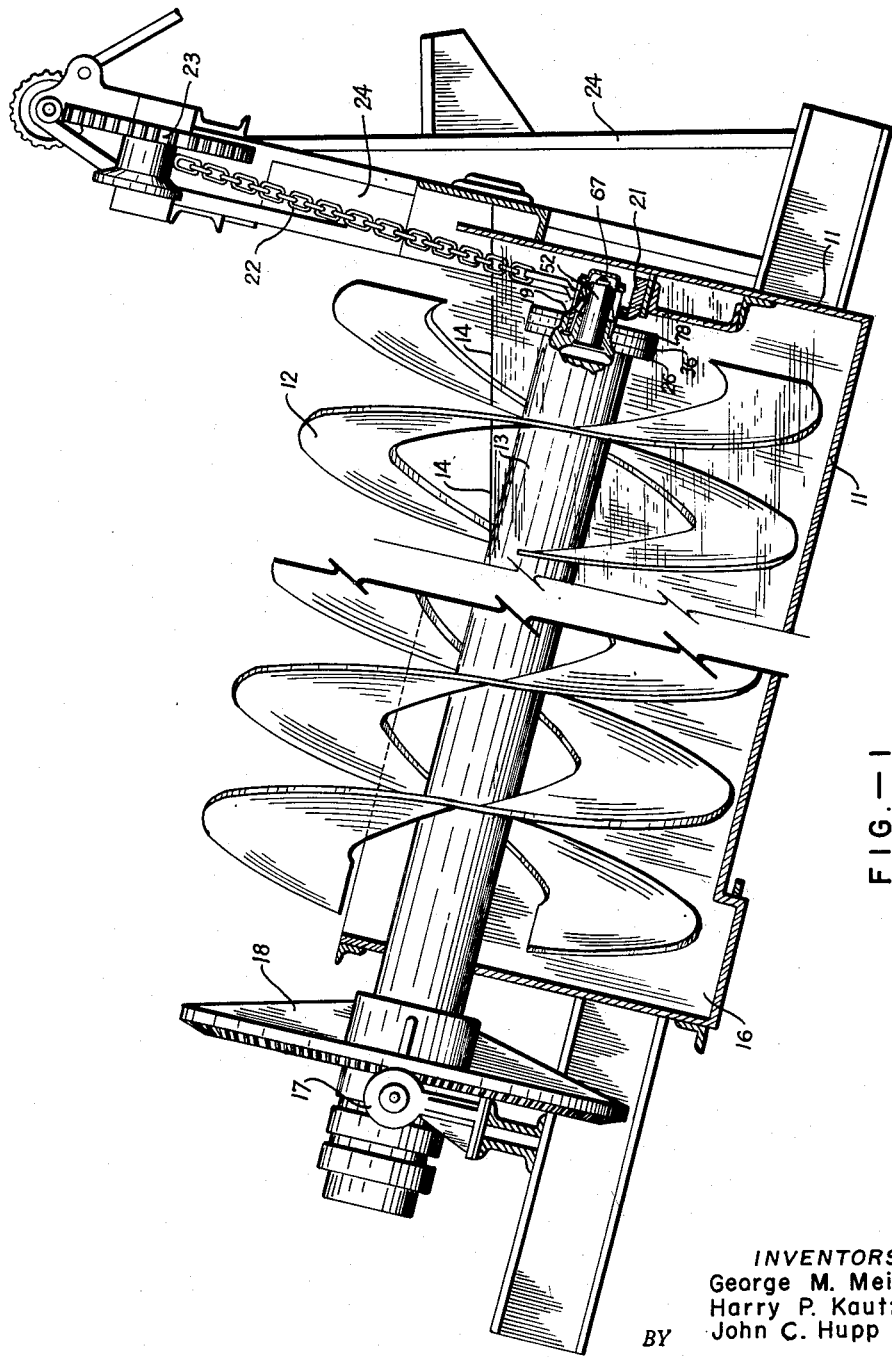

United States Patent Office 2,701,742
Patented Feb. 8, 1955

2,701,742

BEARING ASSEMBLY FOR ROTARY MACHINE ELEMENTS

George M. Meisel, Harry P. Kautz, and John C. Hupp, Denver, Colo., assignors to Colorado Iron Works Company, a corporation of Maine Application June 30, 1950, Serial No. 171,464

5 Claims. (Cl. 308—36.1)

This invention relates to bearing and support members for machinery and more particularly to a bearing arrangement suitable for submerged use.

Previously, many different types of bearings have been devised and disclosed for accomplishing purposes similar to the objectives of the present invention. Accordingly the present invention is intended to be an improvement on such prior forms. Specifically the present invention is closely related to the mechanisms disclosed in the patent to T. A. Dickson, No. 2,046,613 since the bearing herein disclosed is intended primarily for use on ore classifiers of the type shown in the Dickson patent.

The objects of the present invention are:

To provide an improved bearing for machine elements which is of a relatively more compact design than previous types of bearings for similar purposes;

To provide a bearing and auxiliary structure therefor which may be operated in submerged positions without contamination of the bearing lubricant;

To provide a bearing assembly for ore classifiers that is more economical to construct and maintain;

To provide a bearing assembly for liquid treating machines which may be suitably supported in adjusted position above or below the level of liquid received in the machine;

To provide a bearing assembly for liquid handling machines which may be used in submerged positions and which may be interconnected with a source of lubricant supply stored at a position out of contact with the submerging liquid; and To provide novel means for supporting and elevating the bearing and shaft assembly of ore classifiers.

Other objects and advantages of the present invention will be apparent from the appended description and drawings in which:

Fig. 1 is a cross sectional elevation in partial section showing a classifier utilizing a bearing assembly and support therefor made in accordance with the present invention.

Fig. 2 is a cross sectional elevation taken along a center line of the shaft and bearing assembly of the classifier shown in Fig. 1; and Fig. 3 is a partial end elevation showing further features of the bearing support and elevating mechanism shown in Figs. 1 and 2.

Briefly stated the present invention provides an improved type of bearing support for rotary machine elements which incorporates features that make the bearing assembly suitable for submerged use. The assembly includes a stub shaft adapted to be secured in the end of a relatively elongated hollow shaft for rotation therewith. Seats for bearing raceways are provided on the outer end of the stub shaft, and a support casing likewise providing external seats for bearing members is adapted for placement about the stub shaft to form a grease retaining reservoir adjacent the bearings that are placed for rotation between said stub shaft and casing. Grease seals are provided between the casing and other structural elements of the stub shaft so that most of the grease introduced into the reservoir through a central opening in the stub shaft will be retained in the reservoir. Further since the grease is kept under pressure at all times the liquid in which the bearing assembly is submerged will not have a tendency to penetrate past the aforementioned grease seals into positions of contact with the bearings. In addition to the improved bearing features of the present invention, the inventors provide a flanged support and elevating member for holding the bearing and shaft assembly in desired positions within the classifier.

Referring now to the drawings, Fig. 1 shows the general features of an Akins type classifier in which the liquid and pulp containing tank is designated by the numeral 11. The flights 12 of a scroll conveyor are formed about an elongated shaft 13 in such manner that rotary motion of the shaft will cause solid particles received in the pool of liquid 14 to be moved upwardly toward the discharge end 16 of the tank 11. The shaft 13 and conveyor flights 12 are supported for rotary motion within the tank 11 by means of an upper pivoted bearing support 17 positioned adjacent to drive gear 18, and a lower bearing assembly 19 which is supported in adjusted position either above or below the liquid 14 by a yoke or hanger 21 and chain 22. As shown, the chain 22 is connected to a gear driven winch 23 so that the hanger 21 and bearing assembly 19 may be elevated to raise the shaft 13 and flights 12 at least partially out of the liquid 14. Suitable frame members 24 support the winch 23 in its elevated position above the pool of liquid 14.

Since the bearing assembly 19 must be in a submerged position during ordinary operation in the pool of liquid 14, it is imperative that the liquid and pulp particles are prevented from entering into the bearings of the assembly 19 to prevent corrosion and consequent undue increase in the frictional forces tending to oppose the rotation of the shaft 13. Likewise, since the bearing assembly 19 will often be operated for a long period of time in its submerged position in the pool of liquid 14 it is necessary to provide some means for supplying grease or other lubricant to the bearings continuously during use. It has previously been found preferably to maintain the grease or lubricant used under pressure so that damage to the seals will allow the escape of lubricant rather than the ingress of water.

In order to fully satisfy the conditions of prospective use, the present inventors have devised a bearing assembly 19 of novel form and arrangement. The details of the bearing assembly are shown in Fig. 2 where it will be noted that the hollow shaft 13 is provided with flanges 26 adjacent the open end of the shaft 13. These outwardly flared flanges 26 are on the end of the shaft which will be received in the pool of liquid 14 when the shaft 13 and flights 12 are lowered into the tank 11. The central passage 27 through the shaft 13 is closed off by means of a circular disk member 28 which is threaded, welded or otherwise secured within the shaft 13 at a position disposed inwardly from the open end of the shaft 13 a distance sufficient to form a substantially cup-shaped opening 29 in the outer end of the shaft 13. A hole 31 is drilled through the center of the disk 28 and a portion of the hole 31 is provided with threads 32 adapted to receive the threaded end 33 of a lubricant supply pipe 34. This lubricant supply pipe 34 passes centrally up through the shaft 13 and is connected with a source of lubricant under pressure at a position removed from the pool of liquid 14.

When the disk 28 is correctly positioned and secured within the shaft 13 a stub shaft support 36 of an external diameter corresponding to the internal diameter of the shaft 13 is inserted into the cup-shaped opening 29 formed by the shaft 13 and disk 28. The stub shaft support member 36 is itself provided with a flange 37 which is urged into engagement with the flange 26. Both of the flanges 26 and 37 are provided with a plurality of aligned holes 38 and 39 through which bolts 41 may be inserted to hold the support 36 and shaft 13 in fixed relative position when the nuts 42 are tightened on the bolts 41. Since the support 36 must be firmly secured to the shaft 13, it is preferable that there should be a pressure fit between these two parts. Since it is also necessary to provide for occasional removal of the stub shaft support 36, a plurality of drilled and tapped holes 43 are provided about the periphery of the flange 37. When it is desired to remove the support 36 from the shaft 13 cap screws or the like may be inserted into these drilled openings 43 to exert pressure against the face of the flange 26 thereby facilitating removal of the support 36.

The inwardly disposed face 44 of support 36 is relieved to provide a concave shaped opening or pocket 46. When the support 36 is placed in the opening 29, this pocket 46 will be in communication with the unfilled portion of the opening 29 and with the passage 31 and grease pipe 34. Accordingly lubricant will be conveyed through the pipe 34 into pocket 46. The outer face 47 of the support 36 is formed to provide an annular groove 48 and a raised boss portion 49. The center section of the support 36 which includes the boss 49 is provided with a concentric opening 51. This opening 51 provides support for a stub shaft 52 which is preferably formed of hard steel for insertion through the opening 51. Stub shaft 52 is either shrunk fit in the opening 51 or pressed therein so that the stub shaft 52 and the flange 53 thereon will be in tight secure engagement with the support 36. An outwardly disposed portion 54 of the stub shaft 52 extends beyond the boss 49 to provide support for the inner races 56 of bearings 57. In Fig. 2 these bearings 57 are shown as tapered roller bearings having outer races 58 and rollers 59 cooperatively arranged to absorb thrust forces exerted on the bearings. The bearings 57 are held on the stub shaft extension 54 by means of a lock nut 61 threaded and secured on threads provided on the outer end of the stub shaft 52.

The inner portion of the stub shaft support member 36 is preferably provided with three spaced tapped holes or openings, one such being indicated at 100 in Fig. 2. These tapped holes or openings are normally closed by removable plugs. When it is desired, however, to remove the bearing housing 62 from association with the support member 36, jackscrews are inserted in the tapped holes or openings 100 and come into contact with the inner end 66 of the bearing housing 62 and serve to force it out from its relationship with the support member 36.

In order to support the outer races 58 of the bearings 57 a bearing housing 62 is provided. This housing 62 is of an internal size and shape as necessary to receive the outer races 58 of the bearings 57. Likewise the internal shape of the housing 62 provides a conical shaped opening 63 which substantially conforms to the outer shape of the stub shaft support boss 49. Actually adequate clearance is provided between the opening 63 and the boss 49 to provide a passage 64 therebetween. The external shape of the housing 62 is of substantially cylindrical formation. However, the inner end 66 of the housing 62 is of a diameter which will provide a considerable clearance between the outer surface of the housing 62 and the walls of the annular groove 48.

A bearing cap 67 is provided to close off the normally open end of the housing 62. Cap 67 may be secured to the housing 62 by means of cap screws 70 or other suitable fastening devices that will provide a tight fit between these two parts. The tight fit mentioned is required since grease under pressure will be introduced into the cavity formed between the housing 62, the stub shaft 52 and the support 36 to lubricate the bearings 57. This lubricant will be conveyed to the reservoirs and passages mentioned through an opening 68 drilled through the stub shaft 52 to interconnect such passages and reservoirs with the grease or other lubricant retained in the pocket 46 and in the opening 29.

Without further structure the grease moved under pressure into contact with the bearings 57 would escape from the bearing assembly 19 through the passage 64 and past the housing 62 and annular groove 48. In order to prevent the escape of lubricant, the present inventors provide a multiple seal grease retainer 69 externally of the housing 62 and within the annular groove 48. As shown in Fig. 2 the grease retainer 69 is made up of a cup-shaped frame 71 having an outer flange 72 for engagement with the outer face 47 of the support 36 and an inner flange 73 disposed adjacent the bottom of the annular groove 48 to provide a support for a plurality of circular grease seals 74 disposed within the frame 71. These grease seals 74 have their inner surface in contact with a cylindrical bearing type slip ring 76 press fit on the external surface of the housing 62. Preferably retainer 69 is held in position by means of dowel pins 77 or other securing devices.

To complete the full assembly a packing flange 78 having a central opening 79 of sufficient size to fit over the slip ring 76 is secured to the flange 26 of shaft 13 and to the support flange 37 by means of bolts 81 and nuts 82. Where desired the inner surface of the flange 78 which is cut away to provide a recess 83 into which the retainer 69 fits may be further relieved to provide a groove 84 into which felt packing 86 may be placed to further assure a water-tight seal for the bearing assembly 19.

The structure of the hanger 21 is more fully shown in Fig. 3 where it will be noted that the hanger 21 is formed of cast steel or flat plate material having an elongated opening 87 cut in the face thereof. The lowermost portion of this opening 87 provides a curved surface 88 which is adapted for engagement in a substantially semi-circular groove 89 cut in the housing 62 (see Fig. 2) at a position intermediate the bearings 58. This positioning of the hanger 21 assures support for the shaft 13 in the plane of the bearings 58. Beyond the round shaped portion 88 the hanger 21 is bent angularly to provide a flange 91 which extends outwardly away from the bearing assembly 19. When the shaft 13 is in its lowered position this flange 91 is in weight-supporting contact with a shelf-like bracket 92 formed on the inner upright surface of the tank 11. Because of the structure all of the weight of the shaft 13 and flights 12 is transmitted through the stub shaft 52, the bearings 57, housing 62, hanger 21 and bracket 92 to the tank 11 and the supporting framework 24 when the shaft 13 is in its lowered position.

When it is desired to raise the shaft 13 and flights 12 out of the pool of liquid 14, the winch 23 is used to shorten the chain 22 thereby raising the hanger 21 and bearing assembly 19. When in the raised position the weight of the shaft 13 and bearing assembly 19 is transmitted through the hanger 21, the chain 22 and the winch 23 to the frame 24. It should be noted that when the shaft 13 is in either its raised or lowered position, the housing 62 will not rotate in the hanger 21 since the groove 89 cut only in the lower surface of the housing 62 is in relatively secure mating engagement with the circular portion 88 of the hanger 21. Where desired the rotating tendencies of the housing 62 may be further eliminated by flattening the opposite sides of the housing 62 so that these sides will be in relatively close engagement with the sides 97 of the opening 87 in the hanger 21. This feature is shown in Fig. 3.

It will be apparent from the foregoing description and drawings that the present invention efficiently satisfies the objectives set forth. Likewise it will be noted that the invention is adaptable to various modifications and changes other than those shown and described. For this reason the inventors do not wish to be limited to the single form and embodiment shown but intend only to be limited within the scope of the hereunto appended claims.

What is claimed is:

1. A bearing assembly for rotary mechanisms comprising an elongated shaft having an opening in one end thereof, a stub shaft support member closing said opening, an annular groove in an outwardly disposed face of said member, a stub shaft extending through said support member and protruding beyond said face thereof, bearings in engagement with the protruding end of said stub shaft, a bearing housing enclosing said bearings, said housing having one open end thereof extended into said annular groove to provide a clearance between said stub shaft support member and the inner surface of said housing for the passage of lubricant, at least one seal disposed at the outer end of said annular groove to prevent the entrance of foreign matter into said bearing assembly, and means for introducing lubricant from said elongated shaft and through said stub shaft to said bearings.

2. A bearing assembly for rotary mechanisms comprising a tubular elongated shaft, a disk in and adjacent one end of said shaft, a stub shaft support member closing said shaft and spaced from said disks forming a lubricant compartment therebetween, an annular groove in an outwardly disposed face of said member, a stub shaft extending through and protruding beyond the face of said support member, bearings in engagement with the protruding end of said stub shaft, a bearing housing enclosing said bearings, said housing having one open end thereof extended into said annular groove to provide clearance between said stub shaft support member and the inner surface of said housing for the passage of lubricant, at least one seal disposed at the outer end of said annular groove to prevent the entrance of foreign matter into said bearing assembly, means for introducing lubricant into said lubricant compartment from said elongated shaft, and means for introducing lubricant from said compartment to said bearings.

3. A bearing assembly for a submerged end of rotary classifiers comprising a tubular elongated shaft, a disk in one end of said shaft, a disk-like stub shaft support member closing said shaft and spaced from said disk forming a lubricant compartment therebetween, said member having an annular groove in an outwardly disposed face thereof, a stub shaft extending through and protruding beyond said face of said support member, bearings in engagement with the protruding end of said stub shaft, a bearing housing enclosing said bearings, said housing having one open end thereof extended into said annular groove to provide clearance between said stub shaft support member and the inner surface of said housing for the passage of lubricant, a cylindrically formed grease seal retainer having a plurality of seals therein disposed between said housing and said stub shaft support member to prevent the entrance of foreign matter into said bearing assembly, a packing flange having a central opening therein, said flange in engagement with said stub shaft support member enclosing said retainer, means for introducing lubricant into said lubricant compartment from said elongated shaft, and means for introducing lubricant from said compartment to said bearings.

4. A bearing assembly for a submerged end of rotary classifiers comprising a tubular elongated shaft, a disk in one end of said shaft, a disk-like stub shaft support member closing said shaft and spaced from said disk forming a lubricant compartment therebetween, said member having an annular groove in an outwardly disposed face thereof, a stub shaft having a central opening for the passage of lubricant therethrough, said stub shaft extending through and protruding beyond said face of said support member, bearings in engagement with the protruding end of said stub shaft, a bearing housing enclosing said bearings, said housing having one open end thereof extended into said annular groove to provide clearance between said stub shaft support member and the inner surface of said housing for the passage of lubricant, a cylindrically formed grease seal retainer having a plurality of seals therein disposed between said housing and said stub shaft support member to prevent the entrance of foreign matter into said bearing assembly, a packing flange having a central opening therein, said flange in engagement with said stub shaft support member enclosing said retainer, a seal member between the outer surface of said grease seal retainer and said packing flange, and means for introducing lubricant from said elongated shaft into said lubricant compartment for passage through said stub shaft to said bearings.

5. A bearing assembly for a submerged end of a spiral classifier comprising a tubular elongated shaft, a stub shaft support member of smaller diameter than the diameter of said tubular shaft extending outwardly from the submerged end thereof and providing an outwardly disposed face, said stub shaft support member being relieved on the outwardly disposed face thereof to provide an annular groove, a stub shaft extending through said support member, bearinsg adapted for engagement with the protruding outer end of said stub shaft, a bearing housing of generally cylindrical form for enclosing engagement with said bearings, said housing being provided with an exterior, downwardly disposed, substantially semi-circular groove on the center line between said bearings, a hanger supporting said bearing assembly, said hanger having a surface thereof adapted for mating engagement with the groove in said housing, and means for adjusting the position of said hanger and of said tubular elongated shaft as necessary during the operation of said classifier.

References Cited in the file of this patent

UNITED STATES PATENTS

| | | |
|---|---|---|
| 277,070 | Seldon | May 8, 1883 |
| 1,332,815 | De Young | Mar. 2, 1920 |
| 2,035,926 | Smith | Mar. 31, 1936 |
| 2,046,613 | Dickson | July 7, 1936 |
| 2,152,727 | Baumheckel | Apr. 4, 1939 |
| 2,241,178 | Bousman | May 6, 1941 |
| 2,516,918 | Roubal | Aug. 1, 1950 |
| 2,618,519 | Steinmetz | Nov. 18, 1952 |